Aug. 19, 1969     W. A. McMORRIS     3,462,611

TRANSFORMER SWITCHING USING A PAIR OF THREE-POSITION SWITCHES

Filed Dec. 28, 1966

Inventor,
William A. McMorris
by Francis K. Doyle
His Attorney.

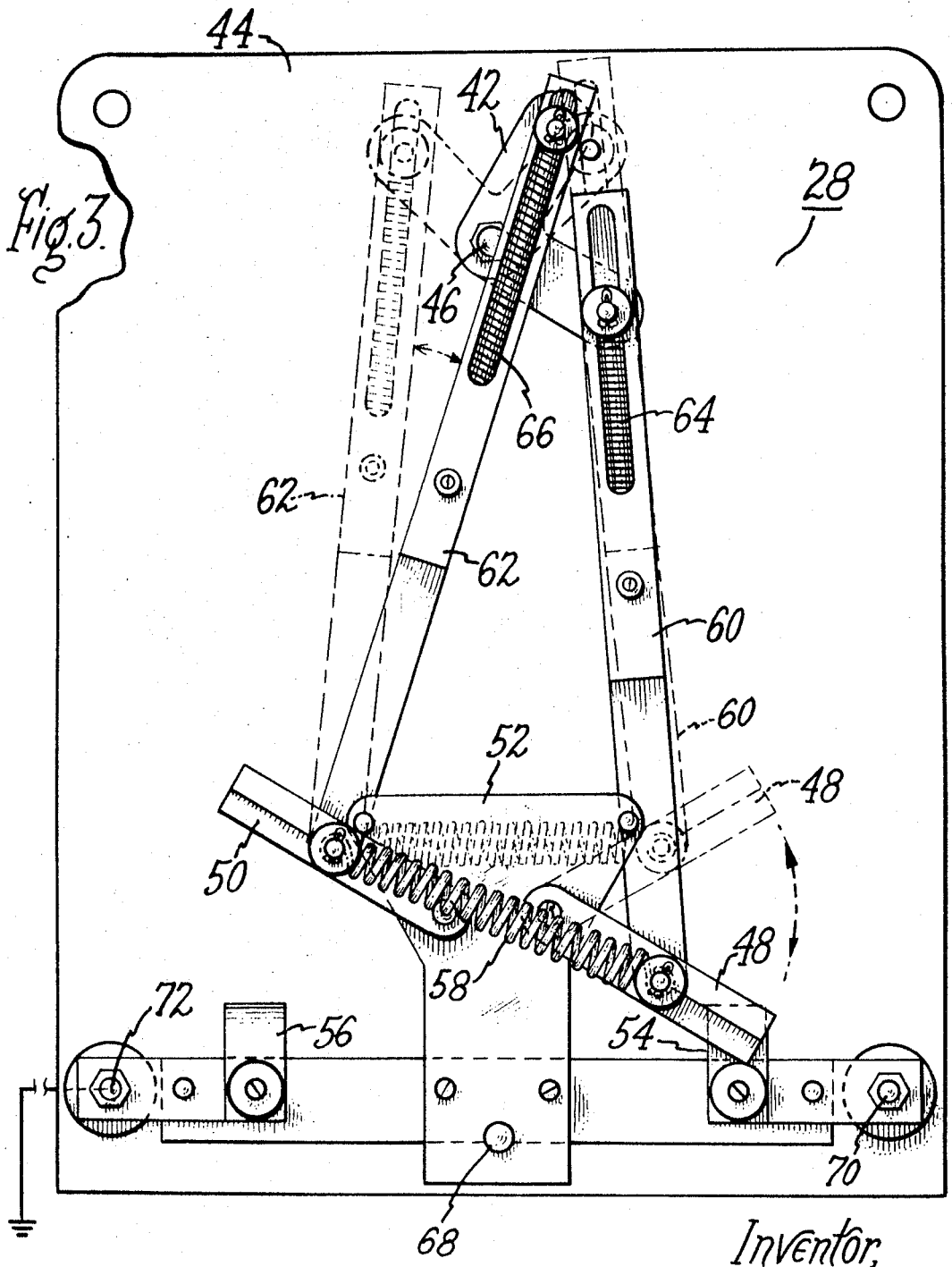

United States Patent Office 3,462,611
Patented Aug. 19, 1969

3,462,611
TRANSFORMER SWITCHING USING A PAIR OF THREE-POSITION SWITCHES
William A. McMorris, Pittsfield, Mass., assignor to General Electric Company, a corporation of New York
Filed Dec. 28, 1966, Ser. No. 605,278
Int. Cl. H02j 3/38
U.S. Cl. 307—17             2 Claims

ABSTRACT OF THE DISCLOSURE

A transformer switching means for use in primary loop-feed circuits in which a pair of switching devices are provided, one switching device being connected to the transformer primary and another switching device being connected to an incoming energizable cable. Each switching device has three positions such that the transformer primary may be connected to an energized line or open circuit or ground, while the cable connection may be connected to the transformer primary or open circuit or ground.

BACKGROUND OF THE INVENTION

This invention relates to transformer switching and more particularly to the provision of a pair of switching means in a transformer to provide loop-feed circuit switching with grounding means for both the transformer and a connected cable.

Present day distribution systems for use in underground distribution often make use of a loop-feed system of energizing the primary circuits of the various distribution transformers. In this type of system, a pluarlity of distribution transformers are connected in an open loop circuit to a source of electrical power. Each distribution transformer of the system is provided with two energizable power lines such that the transformer may be energized from either line. With this type of system, if any transformer or section of primary cable develops a fault, the remaining portions of the system may be energized by the alternate cables. A plurality of various switches have been developed for use in switching the various cables and transformers in loop-feed systems. One such switch is described and claimed in Patent No. 3,150,243.

One problem which has become evident in the loop-feed systems is the need for grounding cables and transformers when they are isolated from the system for repair or maintenance. Many utilities require that the grounding means be provided, as a safety measure, in each of the elements or segments of loop-feed systems. In many present day transformers, independent means are provided for grounding the various portions of the system. One such device is a grounded plug. With this device, the termination of a cable may be connected to the ground plug after it is removed from the transformer. Obviously, the use of independent grounding means requires an extra step in the operating procedure to perform the grounding function. In some circumstances, it requires the handling of an ungrounded cable when moving it from the transformer. In some installations, particularly if the transformers are installed below grade level so that the transformers and their connections may be subject to submersion, the connections may be of the "dead-front" type, with all live parts covered and therefore not accessible for the attachment of external grounding connections. Plug-in connectors are commonly used to provide points at which the circuit may be opened to gain access for grounding, isolating or otherwise changing connections. However, the strict interpretation of the safety operating procedures of some utilities would prohibit the opening of a plug-in connection until that part of the circuit was grounded. It is therefore desirable to provide a grounding means in the switching system so that when desired, either a cable or a transformer can be grounded by means of the switching device, before gaining access to any energizable portion of the circuit.

Therefore it is one object of this invention to provide a transformer switching means incorporating a grounding position.

A further object of this invention is to provide a loop-feed switching means whereby either a cable or a transformer of a loop-feed system may be grounded.

SUMMARY

In carrying out this invention in one form, a pair of 3-position switches are provided in each transformer of a loop-feed primary system. One of the switches is connected to the primary winding of the transformer with the three positions of the switch enabling a connection to be made from the transformer primary to an energized cable, or to an open position, or to a grounded position. The other switch is connectable to a second energized cable with the three positions of the switch enabling such second energized cable to be connected to the transformer primary or to an open position or to a ground position. By use of this switching means any segment of the loop-feed cable can be grounded and any transformer in the system can be grounded without need of an independent grounding means.

The invention sought to be protected will be particularly pointed out and distinctly claimed in the claims appended hereto. However it is believed that this invention and the manner in which its various objects and advantages are obtained as well as other objects and advantages thereof will be better understood from the following detailed description of a preferred embodiment especially when considered in the light of the accompanying drawings.

BRIEF DESCRIPTION OF THE DRAWINGS

FIGURE 3 is a plan view of a preferred type of three position switch for use in the system of the invention.

DESCRIPTION OF PREFERRED EMBODIMENT

Figure 1:
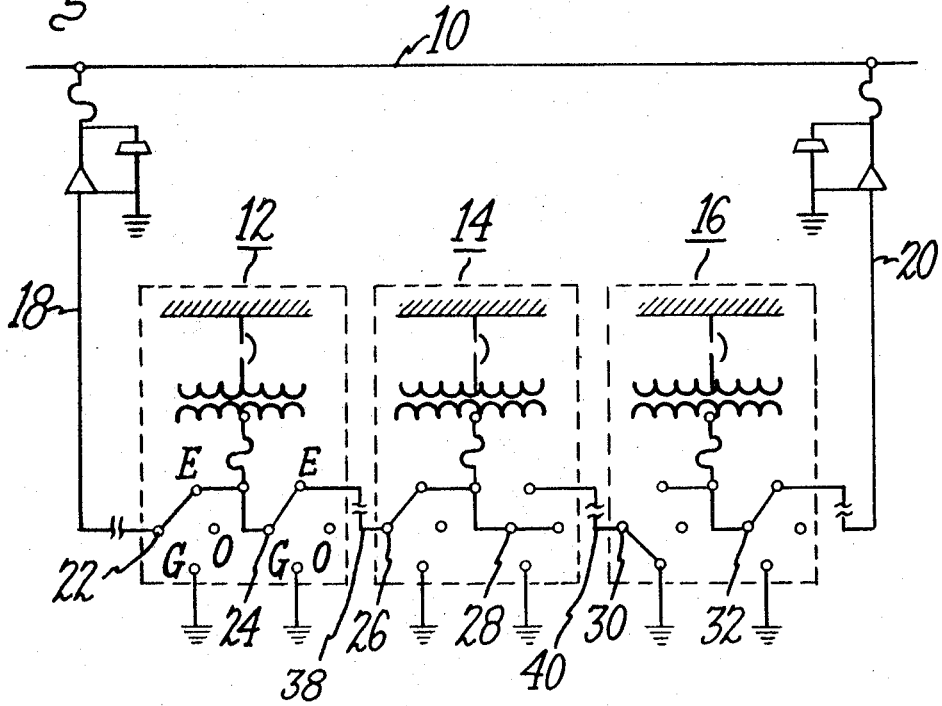
FIGURE 1 is a schematic representation of a loop-feed distribution system showing a preferred embodiment of the invention.
Figure 2:
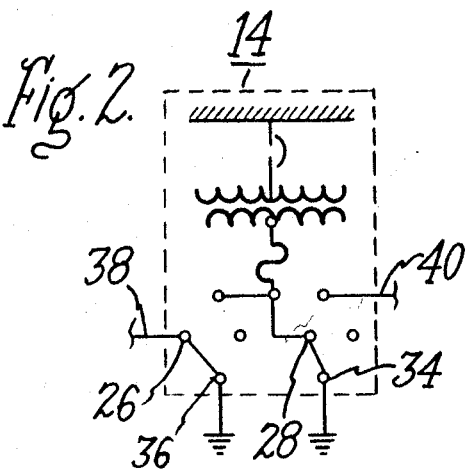
FIGURE 2 is a schematic representation of one of the distribution transformers of a loop-feed system showing the preferred switching in another position.

Reference will now be made to the drawings, in which like numerals are used to indicate like parts throughout the various views thereof. FIGURES 1 and 2 show a novel transformer switching means according to a preferred embodiment of this invention. This switching means is especially suitable for use in loop-feed distribution systems in which the distribution transformers are installed on concrete pads or in underground vaults. Referring first to FIGURE 1 there is shown a schematic representation of a loop-feed distribution system, which comprises a plurality of distribution transformers connected in an open loop to a source of electrical power. As shown, the loop-feed system comprises the source of power 10 and the distribution transformers 12, 14 and 16. Only three transformers are shown, but it will be understood that the loop-feed system may contain as many as desired, or as is possible, in accordance with the primary power source 10. The various distribution transformers are all connected to power source 10 through either of lines 18 or 20 and the various transformer switching devices, which will be more fully explained hereafter. For illustrative purposes only, transformers 12 and 14 are shown as connected to lines 18 while transformer 16 is shown as connected to line 20. It will be noted that the line is open between transformers 14 and 16 and that one side of the open line is connected to ground.

In order to provide the desired loop-feed distribution system each of the transformers is provided with a pair of three-position switches schematically indicated at 22, 24 in transformer 12; 26, 28 in transformer 14; and 30, 32 in transformer 16. Each switch is provided with three positions; an energized position as is indicated by E in transformer 12; an open position, as is indicated by O in transformer 12; and a grounded position as is indicated by G in transformer 12. As will be understood, the transformers 12, 14 and 16 may be either pad mounted or underground. The switches are preferably mounted in the transformer and have an operating handle (not shown) on the exterior of the transformer for operation by a "hot stick" or the like. It is also preferred that the operating handle be provided with an indication of the position of the switch for example, in the manner shown in application Ser. No. 467,648, filed June 28, 1965, for a "Two-Position, Snap Action, Positive Indication Switch," filed in the name of William F. Dripps and assigned to the same assignee as this invention.

One of the switches in each transformer is mounted in the transformer with its common terminal connected to the primary of the transformer. These are indicated by the switches 24, 28 and 32 of FIGURE 1 and switch 28 of FIGURE 2. One contact position of each of these transformer primary switches is provided with an electrical connection to a terminator or the like (not shown) to which may be connected an energized primary cable of the primary loop-feed distribution system such as, for example, cable 20 from power source 10 in FIGURE 1. These treminators are well known in the art, one example being shown in Patent 3,243,756. A second position of the transformer primary switch is an open position in which the movable contact or contacts at the switch is completely electrically isolated. In the third position of the switch the primary of the transformer will be connected directly to ground. This is particularly shown in FIGURE 2 in which the switch 28 connects the primary of transformer 14 to a ground contact 34.

The second switches which are mounted in the transformer are mounted such that their common terminals are provided with an electrical connection to a terminator to which may be connected an energized primary cable. These switches are schematically indicated at 22, 26 and 30 in FIGURE 1, and at 26 in FIGURE 2. These may be considered the primary cable switches and they will be connected electrically to a terminator or other connecting means so that the primary cable of the loop-feed distribution system may be electrically connected to the common terminal of the switch. The various contact positions of the switches are shown and will be, for example, the energized position in which the common terminal of the primary cable switch will be connected to the primary of the transformer, for example, as indicated by position of switch 22 of transformer 12 in FIGURE 1. In the second position of the primary cable switch, the movable contact or contacts, will be in an isolated or open position. In the third position of the primary cable switches the primary cable termination will be connected directly to ground position, as is indicated, for example, at 36 of switch 26 in FIGURE 2. By use of a pair of switches, which are indicated in the above discussion as the transformer primary switch and the primary cable switch, it is possible to provide a loop-feed distribution system in which the loop may be completed through each transformer to the following transformer. For example, in the manner indicated in FIGURE 1, where line 18 from the source 10 is connected through switch 22 and energized contact E to the primary of transformer 12. The primary of transformer 12 is connected through switch 24 and energized switch position E to the cable member 38 between transformers 12 and 14. As shown, cable 38 is connected to the primary cable switch 26 in transformer 14 and cable switch 26 is connected in the energized position to energize the primary of transformer 14. Inasmuch as transformer 16 is connected to line 20 through transformer primary switch 32, there is no energized connection between transformer 14 and 16. Therefore, the primary cable switch 30 of transformer 16 is connected to the grounded position as shown, while the primary transformer switch 28 of transformer 14 is connected to the open or isolated position. Obviously, inasmuch as the primary of transformer 14 is energized it is not desirable to have the transformer primary switch 28 connected to ground. Further, since the primary cable 40 between transformers 14 and 16 need not be energized, the switch 28 should not be placed in the energized position. Therefore, it is left in the open position as shown. Of course, it will be understood that both cables 38 and 40 indicated as being connected between transformer 12 and 14 and transformers 14 and 16 respectively, could be as long as desired and could be provided with any number of transformers therebetween. Each such additional transformer would similarly be provided with a primary cable switch and a transformer primary switch as is indicated in each of the transformers shown in FIGURE 1.

From the review is the above, it will be obvious to those skilled in the art the manner in which a transformer may be isolated from the system in order to inspect the transformer, to provide repair of such transformer or for changing out such transformer. It will also be apparent the manner in which a portion of the primary cable could be isolated from the system for repair or inspection or changing as is necessary. FIGURE 2 provides an example of the use of the switching devices to both isolate and ground a transformer and to isolate and ground the primary cable segment. Referring now to FIGURE 2, there is shown the distribution transformer 14 which is provided with a primary cable switch 26 and a transformer primary switch 28. In the example shown in FIGURE 2 both the primary cable switch 26 and the transformer primary switch 28 are connected to the grounded contacts 36 and 34, respectively. By means of primary cable switch 26 the cable 38 between transformers 12 and 14 is grounded. Obviously were this done, it would be necessary to first place the transformer primary switch 24 in its open position. With the one end of primary cable 38 open and the other end grounded as described, it is possible to inspect, repair and change out the primary cable 38 without any danger of live voltages to the repair crew. In a similar manner, by placing primary transformer switch 28 in the grounded position, as shown, it is possible to inspect, repair or change out transformer 14, again being certain that the transformer is de-energized and that no stray voltages are left within the transformer primary. Obviously, the other end of the cable 40 would be grounded, as shown in FIG. 1. Thus, from the above it will be apparent that by means of the transformer switching set forth in this invention that it is possible to provide switching means for transformers in a primary loop-feed distribution system in which any segment of the primary cable may be grounded and also any transformer in the system may be grounded by means of the switching devices without the use of independent switching means.

As will be understood it is desirable to use a snap acting switch for the three-position switch of the invention so as to provide positive opening and closing of the switch to either of its energized contacts. This is deemed necessary to prevent any sustained arc from being drawn between a stationary contact of the switch and a movable contact and also to prevent the welding of the movable contacts to the stationary contacts of the switch. As earlier indicated, one type of three position snap action switch which may be utilized in this invention is shown in Patent 3,150,243 which is assigned to the same assignee as this invention. Considering now FIGURE 3 of the drawings, there is shown one embodiment of a three position snap action switch which may be used in this invention and which is disclosed in the aforesaid Patent 3,150,243. Inasmuch as the proposed switch of FIGURE 3 is thoroughly described in Patent 3,150,243, only a brief description of it will be provided herein.

Referring now to FIGURE 3, an actuating member is provided in the form of a crank arm 42, which is movably secured to a mounting member 44 which may be, for example, the wall of a transformer. The crank 42 is movably secured on mounting member 44 by means of a shaft member 46. Movable contact members 48 and 50 are provided which are pivotally mounted on a terminal board 52 which may be secured to mounting member 44 in any desired manner. The movable contacts 48 and 50 are movable into and out of engagement with the fixed contacts 54 and 56, in the manner shown. Spring members 58 are connected between the movable contacts 48 and 50, as shown and aid in moving the movable contacts into and out of engagement with the fixed contacts. Connecting means 60 and 62 are provided which connect the movable contacts 48 and 50 respectively to the crank member 42 for moving the contacts into and out of engagement with the fixed contacts 54 and 56. Each of the connecting means 60 and 62 is provided with spring members 64 and 66 which operate in the manner described in patent 3,150,243 to provide snap acting of the contacts 48 and 50. Terminal members are provided on the switch shown in FIGURE 3 which may be for example switch 28 of FIGURES 1 and 2. The common terminal shown at 68 is designed to be connected to the primary of the transformer 14. Of course, it will be understood that, where the switch is a primary cable switch, that the terminal 68 will be provided with means for electrical connection to the primary cable, in the manner previously discussed. Each of the fixed contacts 54 and 56 is provided with a terminal indicated at 70 and 72. Where the switch shown in FIGURE 3 is the transformer primary switch 28, terminal 70 will be provided with means for electrical connection to a primary cable. Terminal 72 will be a ground terminal. In the position of switch 28 shown in FIGURE 3 it will be apparent that terminal 70, which is connected to a primary cable will be connected by means of movable contact 48 to terminal 68 which is in turn connected to the primary of transformer 14. Thus, in the position shown, transformer 14 would be connected to the primary cable 40 for energizing by such primary cable. Movable contact 50 is shown in the open position. Also shown in FIGURE 3, in dotted lines is the open position of movable contact 48. This would correspond to the open position or position O shown in FIGURES 1 and 2. Were the switch 28 moved to the opposite side such that movable contact 50 were connected to fixed contact 56 with movable contact 48 in the open position shown in the dotted lines, then the transformer primary would be connected to the ground terminal 72 such as is shown in transformer 14 of FIGURE 2. Of course, it will be understood that where the switch shown in FIGURE 3 of the drawing is the primary cable switch, terminal 68 will be provided with means for electrical connection to a primary cable and terminal 70 will be provided with a connection to the primary cable of the transformer. Thus when in the position shown in FIGURE 3, the primary of the transformer would still be connected to the energized cable, where the energized cable was connected to terminal 68 and the transformer primary was connected to terminal 70. From the above, it is apparent that the three position switch which is shown and described in Patent 3,150,243 finds exceptional utility for use in the transformer switching described in this invention.

While there has been shown and described the present preferred embodiment of this invention it will be apparent to those skilled in the art that various changes may be made without departing from the spirit and scope of the invention particularly as it is set forth in the appended claims.

What is claimed as new and which it is desired to secure by Letters Patent of the United States is:

1. A transformer switching means for use in an underground primary distribution system comprising
   (a) a transformer housing,
   (b) a pair of three-position switching devices mounted in said transformer housing,
      (1) one of said pair of switching devices having its common terminal electrically connected to the transformer primary,
         (a) the three positions of said one switch being electrically connected
            (1) to a terminal for an energized cable,
            (2) to an open connection, and
            (3) to a grounded contact;
      (2) the other of said pair of switching devices having its common terminal electrically connected to a terminal for receiving an energized cable,
         (a) the three positions of said other switch being electrically connected
            (1) to the transformer primary,
            (2) to an open connection, and
            (3) to a grounded contact.

2. A transformer switching device as claimed in claim 1 in which the connections to an energized cable are in the form of terminations providing means to electrically connect energized cables to said pair of switches.

References Cited

UNITED STATES PATENTS 3,078,411   2/1963   Book _____ 336—69 X

ROBERT K. SCHAEFER, Primary Examiner

H. J. HOHAUSER, Assistant Examiner

U.S. Cl. X.R.

200—11; 323—43.5; 336—150